United States Patent
Muren

(10) Patent No.: US 7,494,320 B2
(45) Date of Patent: Feb. 24, 2009

(54) ROTOR FOR PASSIVELY STABLE HELICOPTER

(76) Inventor: Petter Muren, Nesvn, 9, Nesbru, N-1394 (NO)

( * ) Notice: Subject to any disclaimer, the term of this patent is extended or adjusted under 35 U.S.C. 154(b) by 534 days.

(21) Appl. No.: 11/167,211

(22) Filed: Jun. 28, 2005

(65) Prior Publication Data
US 2007/0031253 A1    Feb. 8, 2007

(51) Int. Cl.
  *B64C 11/12* (2006.01)
  *B64C 11/28* (2006.01)
  *B64C 27/50* (2006.01)
(52) U.S. Cl. .................. 416/142; 416/194; 416/195
(58) Field of Classification Search .............. 416/142, 416/143, 132 A, 141, 134, 148, 194, 195
See application file for complete search history.

(56) References Cited

U.S. PATENT DOCUMENTS

| 4,104,003 A | 8/1978 | Mouille |
| 5,639,215 A | 6/1997 | Yamakawa |
| 5,879,131 A * | 3/1999 | Arlton et al. ............ 416/223 R |
| 6,460,802 B1 | 10/2002 | Norris |
| 6,659,395 B2 | 12/2003 | Rehkemper |
| 2004/0245376 A1 | 12/2004 | Muren |

* cited by examiner

*Primary Examiner*—Edward Look
*Assistant Examiner*—Dwayne J White
(74) *Attorney, Agent, or Firm*—Christian D. Abel

(57) ABSTRACT

A rotor (10) that enables an aircraft to become passively stable in hover. The inner part of the rotor blades (11) have a pitch angle fixed relative to a reference plane perpendicular to the rotor shaft (18) axis, and the tip of the rotor blades being connected to a ring (12) encircling the rotor. Each blade is connected to the rotor shaft by a separate hinge having a hinge axis perpendicular to both the rotor shaft axis and to the blade. Because the rotor blades can also easily twist the rotor can tilt freely in any direction. The rotor blades may be disconnected from the ring and folded up for easy transport.

8 Claims, 5 Drawing Sheets

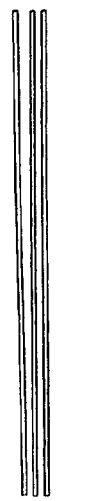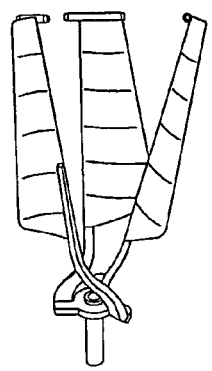
Figure 2a
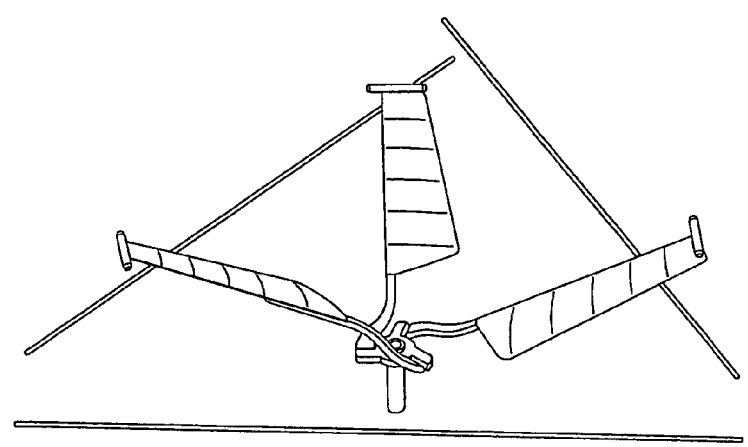
Figure 2b
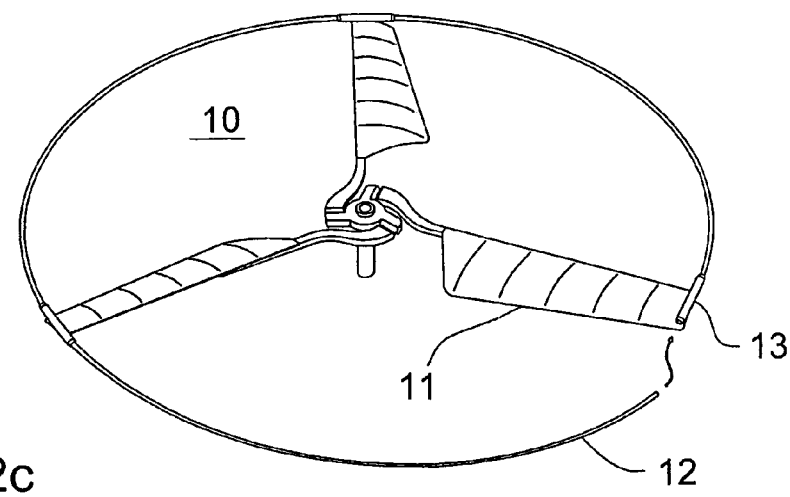
Figure 2c

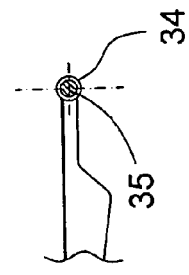
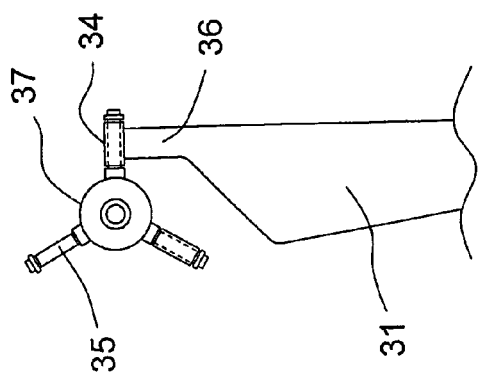
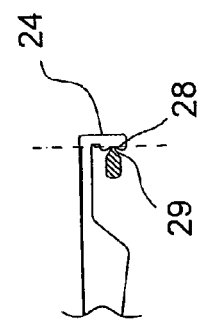
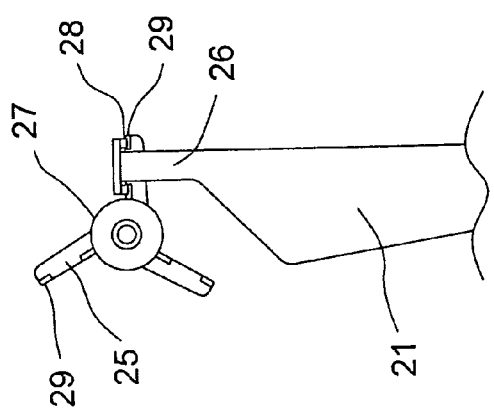
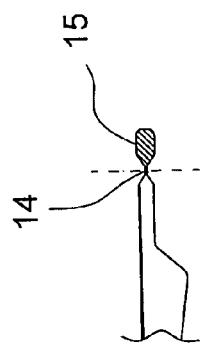
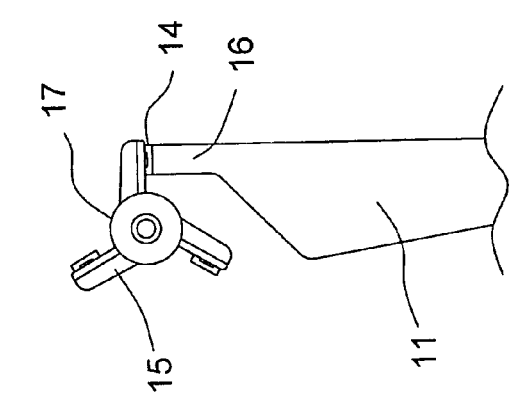

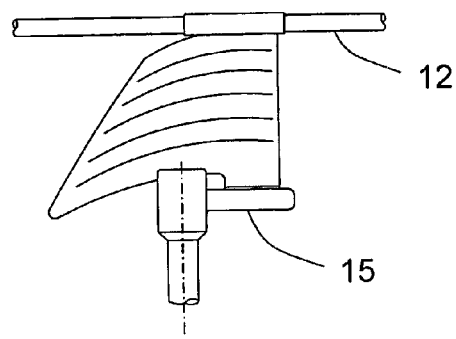
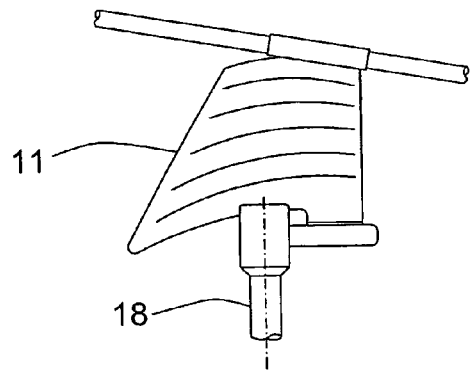
Figure 6a    Figure 6b
Figure 7a    Figure 7b    Figure 7c
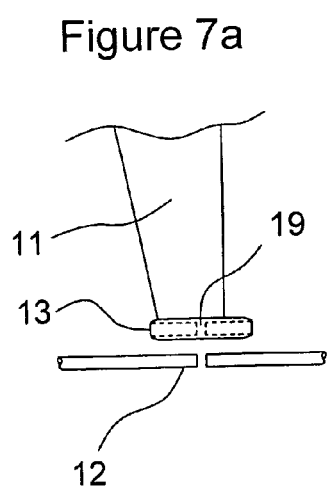
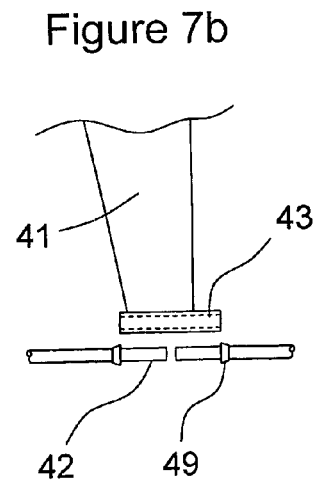
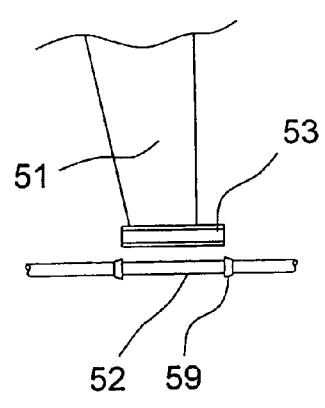

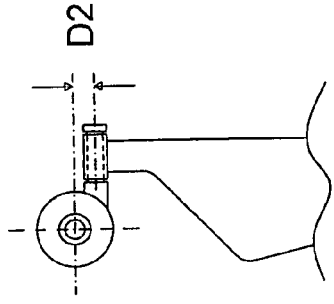
Figure 8c
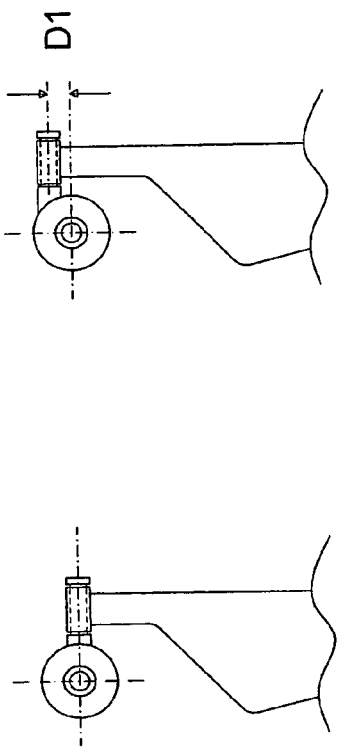
Figure 8b
Figure 8a
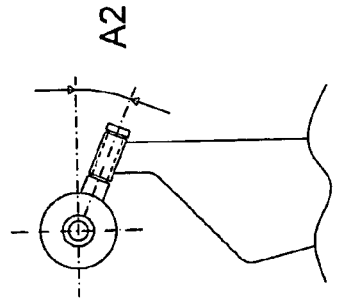
Figure 8e
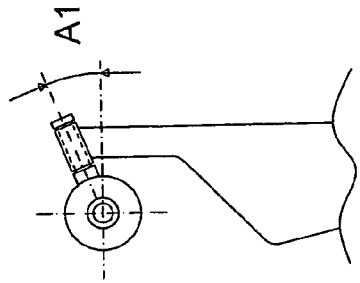
Figure 8d

ROTOR FOR PASSIVELY STABLE HELICOPTER

FIELD OF THE INVENTION

The present invention relates to rotary wing aircrafts such as helicopters, and in particular to a simplified mechanical solution for a rotor that enables passively stable hover. It also relates to different ways of utilizing the invention in such rotors.

BACKGROUND OF THE INVENTION

Typically, rotary wing aircrafts like helicopters are sustained by a rotor, rotating about a vertical rotor shaft, generating lift or upward thrust. In a conventional helicopter the thrust from the rotor can be controlled by changing the pitch angle (or in short; the pitch) of the rotor blades. The pitch is in the field of propeller aerodynamics defined as the lateral angle between the blades and a reference plane perpendicular to the rotor shaft axis.

By collectively changing the pitch of all the rotor blades or by changing the rotational speed of the rotor, the helicopter can be controlled in the vertical direction. The horizontal direction of flight and the stability of the helicopter, however, is controlled by cyclically adjusting the pitch of individual blades. Cyclically adjusting the pitch means that the pitch of each rotor blade is adjusted from a maximum in a particular position of rotation to a minimum at the opposite side. This causes the lift in one part of the rotation to be larger than in other parts, whereby the rotor is tilted with respect to the reference plane. When the rotor tilts like this, the initially vertical thrust also tilts, and therefore gets a horizontal component that pulls the helicopter in the desired direction.

Normally, a helicopter must be actively controlled by a well trained pilot or from gyroscopic sensors and computers. The necessary means to varying and controlling the pitch angle of each blade are normally complicated, expensive and add weight to the helicopter.

Published U.S. application US2004/0245376 to the present inventor discloses a rotor and a coaxial rotor system that enables passively stable hover. The rotor system disclosed in this publication is capable of generating the required lift to enable an aircraft to have sustained stable flight including passively stable hover without the need for active control of the rotor.

In the preferred embodiment disclosed in the above mentioned application the rotor consists of 4 rotor blades arranged in two pairs or sets. The rotor blades are fixed to two center pieces; two rotor blades extending in opposite direction fixed to an upper center piece and the other two rotor blades oriented 90 degrees with respect to the first ones, fixed to a lower center piece. At their tip the blades are fixed to a ring encircling the whole rotor. This ring, per definition, lies in what is normally called the rotating plane of the rotor. Each orthogonally oriented center piece is connected to the vertical rotor shaft with a hinge having axis perpendicular to the longitudinal direction of the rotor blades.

The hinged connection enables the torque from the rotor shaft to spin the rotor while it at the same time allows each set of rotor blades to flap (one blade tilts up while the opposite blade tilts down). The pitch of the inner part of all the rotor blades remains fixed when the rotor tilts, but the pitch of the tip of the rotor blades, however, follow the tilting of the ring. This implies that the rotor blades must be flexible and that one set of blades must twist about their longitudinal axis when the other set of blades flaps up and down.

The rotor disclosed in the above mentioned publication rely on three different means functioning together to control the stability and behavior of the rotor.

Firstly, the hinged connection between each set of rotor blades and the rotor shaft, together with the flexible blades, enables the rotating plane to tilt more or less freely in any direction with respect to the reference plane. This is important to prevent any gyroscopic coupling between the rotor and the helicopter that would otherwise lead to instability of the whole aircraft.

Secondly, the rotor is stabilized with respect to the rotor shaft and the aircraft by keeping the inner part of the rotor blades at a fixed pitch relative to the reference plane. If the rotor and the rotating plane have been tilted, the blades will in effect follow an up-and-down path as they rotate, resulting in different lift in different parts of the rotation, whereby the rotor is tilted back to its initial position by aerodynamic forces. Due to the same effect the rotor will also follow any tilting of the aircraft, thereby enabling horizontal flight by tilting the whole aircraft by means of weight shifting or by a vertical thrust from a small propeller at the back of the aircraft.

Thirdly, in a rotor that moves horizontally the rotor blades will have different relative airspeed depending on where in the rotation they are. In the part of rotation where the blades rotate forward in the same direction as the movement, the relative airspeed increases. The increased speed gives increased lift that starts to tilt the rotor or more precisely the rotating plane up in the front. When the rotating plane tilts, the vertical thrust also tilts and gets a horizontal component acting against the movement, trying to stop it. The fixed pitch relative to the rotating plane (the ring) is important because it very much adds to the tilting tendency and it ensures that even small movements with respect to the surrounding air, will tilt the rotating plane and stop the movement of the aircraft.

When the movement stops, the second means stabilizing the rotor with respect to the rotor shaft, brings the rotor back to its initial position. This third feature reduces the maximum forward speed of the aircraft but on the other hand makes it more stable.

This rotor technology has been used in e.g. different toy helicopters. It is simpler than other helicopter rotors and it enables a remotely controlled, fully maneuverable and passively stable helicopter.

However, the rotor described above consists of several parts and needs careful assembly to function as intended. The number of parts and the possible difficulties during assembly increases the production cost and might give quality problems. Each of the two rotors in the toy helicopters mentioned above consists of 20 smaller or larger parts.

The rotors must be assembled by trained workers at a factory and therefore need to be shipped assembled and ready for use. This requires a relative large box protecting them.

While still utilizing the same basic rotor concept, a different mechanical approach could drastically reduce the number of parts and simplify the assembly. Such a new mechanical solution could also enable the rotor to be folded up for easy shipment.

SUMMARY OF THE INVENTION

The present invention disclosed a new rotor that has a drastically reduced number of parts and is very easy to assemble compared to current rotors used in stable toy helicopters.

This new rotor at least comprises two flexible rotor blades having longitudinal axis and an inner part connected to a hub or a rotor shaft having a central axis, each rotor blade extending outwards, ending in a tip connected to a ring encircling the rotor, the inner part of the rotor blades having a pitch angle generally fixed relative to a reference plane perpendicular to the rotor shaft axis. At least one rotor blade is separately connected to the rotor shaft or hub by a hinge having a hinge axis generally perpendicular to both the rotor shaft axis and to the longitudinal axis of the rotor blade.

Previously, rotors used in passively stable helicopters had a more or less fixed geometry without any single rotor blade being able to flap up and down independently. It has now been discovered that if the blades are independently connected to the rotor shaft with hinges that have very little or almost no friction under high loads, it is possible to achieve passive stability even with independently hinged rotor blades. The discovery with respect to the independently hinged rotor blades is very important as it opens for completely new ways of designing such a rotor.

Three different ways of utilizing the hinges are discussed. A flexible hinge, a V-shaped edge and grove hinge as well as a traditional rotating hinge are described.

In this new rotor the position and orientation of the axis of the hinge connecting the blades and the shaft is important in order for the rotor to tilt more or less freely in all directions. Generally the hinge axis should be perpendicular to both the rotor shaft axis and to the longitudinal axis of the rotor blade and also go trough the rotor shaft axis.

Because each rotor blade is independently connected with hinges to the rotor shaft, they may when they are disconnected from the ring normally encircling the rotor, be folded up for easy transport. The present invention also discloses a simple way to construct the ring by split it into equal parts or rods, same number of rods as the number of rotor blades. When assembling the rotor, the ring is built by connecting the rods together using tubular connection pieces fixed to the tip of each blade.

The rotor must still be designed according to the principles described in US2004/0245376: Having a rotating plane being able to tilt in any direction with respect to a reference plane perpendicular to the rotor shaft axis, having a pitch angle in a first part of the blades fixed with respect to the rotating plane and having a pitch angle in a second part of the blades generally fixed with respect to the reference plane.

Several modifications to the position of the hinge axis and also to the ring are disclosed as well as ways to manufacture these rotors.

BRIEF DESCRIPTION OF THE DRAWINGS

The following detailed description of the preferred embodiment is accompanied by drawings in order to make it more readily understandable. In the drawings:

FIGS. 2*a*, 2*b* and 2*c* show different steps in assembly and connection of the ring encircling the rotor.

FIGS. 3*a* is top view and 3*b* is front view of a rotor blade having a flexible hinge.

FIGS. 4*a* is top view and 4*b* is front view of a rotor blade comprising a V-shape hinge.

FIGS. 5*a* is top view and 5*b* is front view of a rotor blade with a hinge comprising a tube rotating on an inner shaft.

FIGS. 6*a* and 6*b* are side views of a rotor blade in a rotor, shown in a horizontal and a tilted position. The rotor blade can twist along its longitudinal axis.

FIGS. 7*a*, 7*b* and 7*c* shows three different ways of connecting the ring and the rods in the ring to the tip of the rotor lade.

FIG. 8*a, b, c, d, e* is top views of 5 rotor blades showing different angles and positions of the hinge axis.

DETAILED DESCRIPTION OF THE PREFERRED EMBODIMENT

Figure 1:
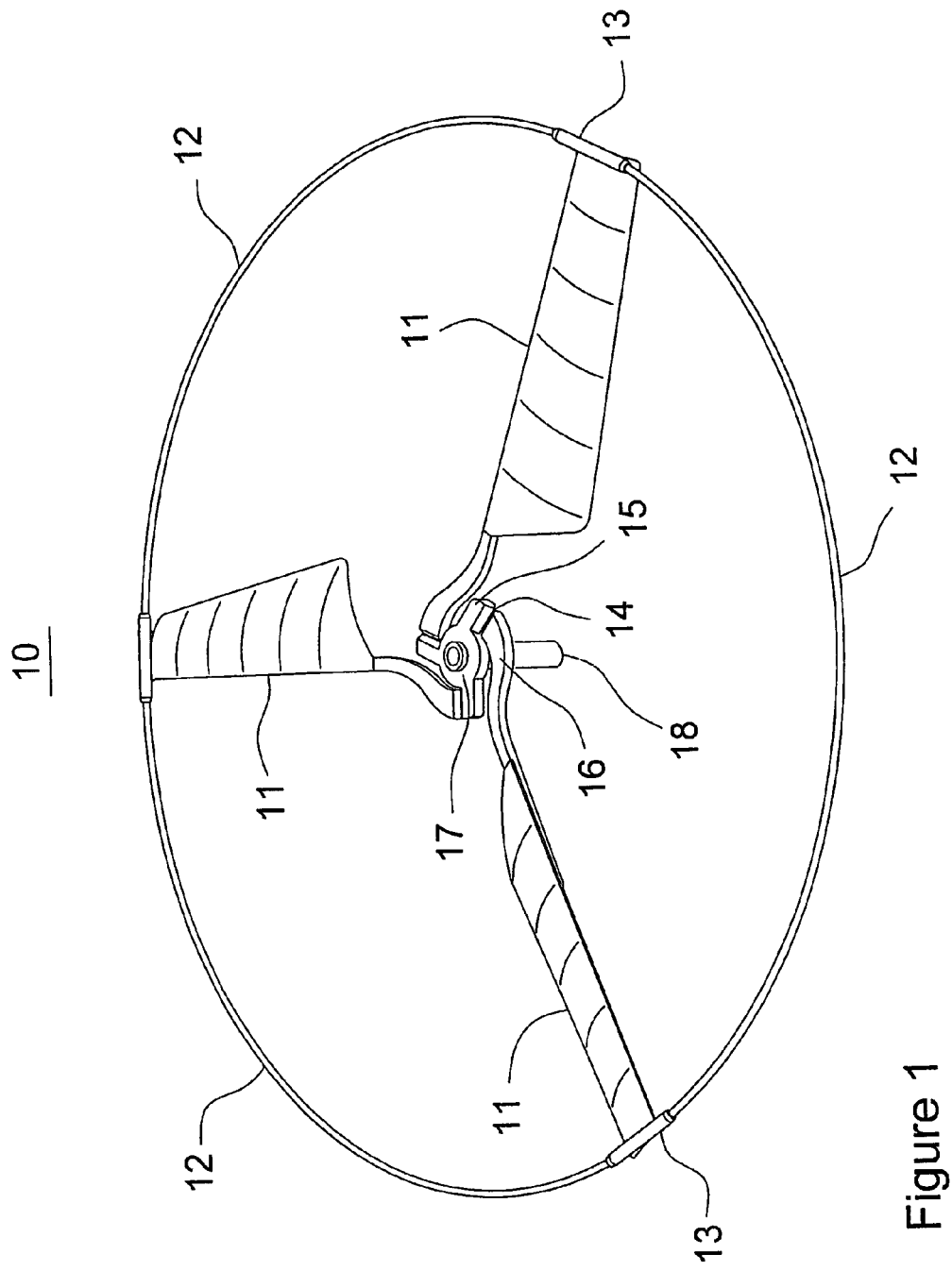
FIG. 1 is a perspective view of a 3-bladed rotor.

In the following the present invention will be discussed and the preferred embodiment described by referring to the accompanying drawings. Some alternative embodiments will be described, however, people skilled in the art will realize other modifications within the scope of the invention as defined in the enclosed independent claims.

In FIGS. 1 and 2 the preferred embodiment of a rotor according to the present invention is shown. The rotor has a rotating plane defined by the path that the tip of the rotor blades follows when the rotor rotates and a fixed reference plane being perpendicular to the rotor shaft axis.

By designed a rotor system according to the principles described in US2004/0245376 (the entire contents of which are hereby incorporated by reference) an aircraft will be able to achieve passively stable hover. This implies that the rotating plane must be able to tilt in any direction with respect to the reference plane, furthermore the rotor blades must have a fixed pitch angle with respect to the rotating plane in the outer part of the blades, and finally, the pitch angle of the inner part of the blades must be fixed with respect to the reference plane. These principles are described in detail in US2004/0245376. Because the present invention represent a new way of designing a rotor according to these principles and not modifications to the principles as such, only the mechanical solution is described in detail not the principles and why it enables a helicopter to become passively stable.

The rotor according to the preferred embodiment (10) consists of three rotor blades (11) with an airfoil having the shape of a thin curved plate. This airfoil is chosen in order to obtain rotor blades that can easily twist and still maintain longitudinal strength. An open cross section like this is known to have very low torsional stiffness and will allow one end of the blade to rotate or twist with respect to the other end, without the blade bending or breaking.

The rotor blades (11) are connected to a single center piece, a hub (17) with hinges (14) that are orientated perpendicular to both the main shaft (18) axis and to the longitudinal axis of the rotor blades. In the preferred embodiment the hinge axis goes through both the main shaft axis and the rotor blade axis. At the tip, the rotor blades have tubular elements (13) that act as connecting pieces for three rod elements (12) that forms a ring encircling the whole rotor (10).

The first hinge axis associated with the first rotor blade, the second hinge axis associated with the second rotor blade and the third hinge axis associated with the third rotor blade, are all orientated 120 degrees with respect to each other. Therefore, at any given point in the rotation, when the rotor (rotating plane) tilts to one side, the blade at that side will flap (the tip move up or down) and because all the tips are fixed to the ring, the other two blades will have to both flap and twist in order to accommodate this tilting.

Since the blades are forced to twist in order to accommodate tilted orientations of the rotating plane, the pitch of the inner part of a blade and the pitch of the outer part of the blade will vary with respect to each other during the rotation. The pitch of the inner part of the blade will remain unchanged with respect to reference plane, while the pitch of the tip will remain unchanged with respect to the now tilted, rotating plane. In FIG. 6*b* a tilted rotating plane and a twisted rotor blade is shown. When the rotating plane is tilted like this, each rotor blade will actually go trough a cycle of tilting and twisting as the rotor spins. Any tilted orientation of the rotating plane will comprise a combination of tilted and twisted blades, including blades that are both tilted and twisted at the same time.

Even if this rotor follows the same basic principle as its predecessors it has a completely new design and different mechanical solutions compared to previous passively stable rotors and represent a major step forward with respect to production cost and complexity.

Returning now to FIG. 2, another important feature in this rotor (10) is clearly seen. Because of the independently hinged rotor blades (11), the rotor blades may, when they are disconnected from the ring, be folded up for easy transportation. When the ring is split into three equal rods (12) and the rotor blades (11) are folded up 90 degrees, the whole rotor will fit into a small tube or narrow box. To assemble the rotor (10) again, the rotor blades (11) are unfolded and the ends of the rods (12) are pushed into the tubular connecting tubes (13) at the tip of each rotor blade (11). When all the rods are in place, the rotor is completely assembled and ready for use, FIG. 2c.

In the preferred embodiment the hinges (14) are made of a layer of very flexible yet durable material, FIGS. 3a and 3b. The hinges (14) have a hinge axis perpendicular to both the rotor shaft axis and the longitudinal axis of the rotor blade and it goes through the rotor shaft axis. The hinges (14) are connected between the inner end (16) of the rotor blades (11) and arms (15) extending horizontally out from the hub (17). The preferred position of the hinge axis allows for the rotor to tilt with a minimum of geometric change, thus the major forces acting against the tilting of the rotor is the twisting of the rotor blades (11) and the aerodynamic forces.

The flexible hinges (14) could e.g. be molded as separate hinges and mounted together with the hub (17) and the blade (11), or it could be a piece of a flexible material glued to, or otherwise connected to, both the arm (15) on the hub and to inner part (16) of the rotor blade. The hinges (14) must be flexible yet strong to form a hinge that allows for the blades (11) to move (flap) with little friction and stiffness, and at the same time transfer the torque from the shaft into the blades. The material used must withstand a very high number of bending cycles as well.

It will also be possible to mould the hub (17) and the rotor blades (11) in a material that when formed into a thin layer during the molding process can be used as a hinge (14). This way both the hub (17), the rotor blades (11) and the hinges (14) may be molded as one piece with no need for assembly other than attaching the ring.

In another embodiment of this invention it could even be possible to mould the ring in the same operation as the blades. By doing so, it would be possible to mould a stable and fully functioning rotor including the hub and the hinges; as one single part. The appearance of a rotor molded as a single part could be similar to the rotor shown in FIG. 1. It will be appreciated by anyone skilled in the art that it is the use of independently hinged rotor blades that enables this single part solution. The production complexity of such a rotor will be just a fraction of current rotors like those used in the previously mentioned toy helicopters.

Different hinges may also be used. In FIGS. 4a and 4b a rotor blade (21) with a V-shaped hinge is shown. An arm (25) with a horizontal V-shaped edge (29) is connected to the hub (27) on the main shaft. The axis going along the top of this edge is positioned similar to the above mentioned hinge axis, going through and being perpendicular to the main shaft axis and being perpendicular to the longitudinal axis of the rotor blade. The V-shaped edge (29) is facing away from the rotor blade (21) and enables a part with a V-shaped groove (28) connected to the inner end (26) of the rotor blade (21) to rest on top of this edge (29). Because the V-shaped grooved (28) part at the inner end of the blade is less pointed than the edged (29) arm it is possible for the blade (21) to flap up and down. The wide V-shaped groove will be able to tilt on top of the more pointed V-shaped edge. The grooved (28) part must be connected to the rotor blade (21) in a way that does not interfere with the arm (25) by e.g. letting an inner, narrower part (26) of the rotor blade (21) pass over the arm (25) and then extend vertically down (24) to attach to the grooved part (28). Ideally the grooved V-shaped part (28) and the rotor blade (21) could be molded as one part.

To be kept in place when the rotor is not spinning the rotor blade (21) must be pulled outwards by the ring encircling the rotor being a little smaller then the nominal diameter, hence pulling on the rotor blades. During operation the centrifugal forces on the rotor blade will keep it in place. To be able to give the rotor sufficient torque without the hinge falling apart, the arm (25) with the V-shaped edge (29) must extend a certain distance from the main shaft axis. The dimensions of the arm (25) is influenced by the torque, typically low rpm requires higher torque and then a longer arm. A heavier rotor blade (21) gives higher centrifugal forces holding the hinge together, hence enables a shorter arm (25). The dimensions may be easily calculated by someone skilled in the art.

In FIGS. 5a and 5b the rotor blade and the hinge axis is similar to the above, however, the hinges are different. They comprise an inner hinge shaft (35) connected to the hub, with axis perpendicular to both the rotor shaft and the longitudinal axis of the rotor blade (31). The inner part (36) of the rotor blade (31) ends in a tube (34). The tube (34) is mounted on the hinge shaft (35). The tube (34) can rotate on the hinge shaft (35) to enable the blade (31) to flap up and down while the pitch angle of the inner part of the rotor blade is unchanged with respect to the reference plane.

The friction in the hinge must be as low as possible. To achieve this, the inner hinge shaft (35) must have a very small diameter and the materials in the shaft and the tube (34) must be chosen to minimize the friction. Alternatively the outer tube (34) could be equipped with ball bearings.

As described earlier the rotor blades may be disconnected from the ring and folded up for easy transportation. In FIG. 2, one possible way of doing this is shown. Furthermore, in FIG. 7, three different ways of attaching the ring to the rotor blades are shown.

FIG. 7a shows a detail of the tip of the rotor blade (11) from FIG. 2. Here the connecting piece is a tube (13) that is mounted on the tip of the rotor blade (11). To make sure that the ends of the rods (12) that make up the ring around the rotor are put correctly into the tube (13), there is a blocked part (19) in the middle of each tube (13). The two rod ends should be pressed into the tube (13) until they are stopped by the block (19) in the middle of the tube (13). The tube (13) is mounted on the rotor blade (11) at an angle to give the correct pitch angle in the outer part of the blade (11).

FIG. 7b show a minor modification to the first embodiment. This tube (43) at the tip of the rotor blade is open all the way trough and instead the rods (42) are positioned by a small ring or rim (49) attached at the correct distance from the end of the rod. The assembly of this rotor is otherwise identical to the preferred embodiment described earlier.

FIG. 7c shows an open or U-shaped "tube" (53) that may be used if the ring (52) is already assembled. In this case the ring is simply snapped onto the tip of the rotor blades (51).

Different modifications to the position of the hinge axis are possible and other embodiments of this invention have a hinge axis that is slightly shifted and/or angled compared to the preferred one. The influence of these modifications to the characteristics of the rotor is just briefly described. The main purpose is to show that these modifications still fall within the scope of this invention.

FIG. 8a, same hinge position as in the preferred embodiment, called the initial position. When tilting the rotor from side to side the only stiffness or spring effect on the rotor comes from the torsional stiffness of the blades that will be twisted when the rotor tilts.

FIG. 8b, hinge axis is still parallel to the initial position, but moved a distance (D1) away from the blade. This gives a rotor that has a higher stiffness then above.

FIG. 8c, same as above but the axis is shifted in the other direction (D2) and is also giving a stiffer rotor. The rotor blades in FIGS. 8b and 8c introduce tilting forces on the rotor shaft. These forces have opposite directions in the two embodiments.

FIG. 8d, here the hinge axis is angled (A1) degrees forward of the initial position. In addition to give a stiffer rotor, the main feature of this angled hinge is that the stabilizing effect of the inner part of the rotor blades will occur earlier in the rotation and to some degree counteract any tendency by the rotor to tilt sideways under forward flight.

FIG. 8e, same principle but opposite angle (A2) with the opposite reaction compared to the above embodiment.

While the preferred embodiment of the present invention has been described and certain alternatives suggested, it will be recognized by people skilled in the art that other changes may be made to the embodiments of the invention without departing from the broad, inventive concepts thereof. It should be understood, therefore, that the invention is not limited to the particular embodiments disclosed but covers any modifications which are within the scope and spirit of the invention as defined in the enclosed independent claims.

The invention claimed is

1. A rotor generating lift, at least comprising a rotor shaft having a central axis and two flexible rotor blades having longitudinal axis, each rotor blade extending outwards from the rotor shaft, ending in a tip, the tips being connected to a ring encircling the rotor, wherein an inner part of the rotor blades have pitch angles generally fixed relative to a reference plane perpendicular to the rotor shaft axis, wherein at least one of said rotor blades is separately connected to the rotor shaft or to a hub by a hinge having a hinge axis generally perpendicular to both the rotor shaft axis and to the longitudinal axis of the separately connected blade,
and further wherein the ring comprises two or more interconnectable tubular elements connected to the tip of the rotor blades.

2. A rotor generating lift, at least comprising a rotor shaft having a central axis and two flexible rotor blades having longitudinal axis, each rotor blade extending outwards from the rotor shaft, ending in a tip, the tips being connected to a ring encircling the rotor, wherein an inner part of the rotor blades have pitch angles generally fixed relative to a reference plane perpendicular to the rotor shaft axis, wherein at least one of said rotor blades is separately connected to the rotor shaft or to a hub by a hinge having a hinge axis generally perpendicular to both the rotor shaft axis and to the longitudinal axis of the separately connected blade, wherein the hinge comprises a flexible material connecting the rotor blade and an arm extending generally horizontally outwards from the rotor shaft.

3. A rotor generating lift, at least comprising a rotor shaft having a central axis and two flexible rotor blades having longitudinal axis, each rotor blade extending outwards from the rotor shaft, ending in a tip, the tips being connected to a ring encircling the rotor, wherein an inner p art of the rotor blades have pitch angles generally fixed relative to a reference plane perpendicular to the rotor shaft axis, wherein at least one of said rotor blades is separately connected to the rotor shaft or to a hub by a hinge having a hinge axis generally perpendicular to both the rotor shaft axis and to the longitudinal axis of the separately connected blade, wherein the hinge is comprising two parts, a first part having a V-shaped edge resting inside a V-shaped grove in a second part, the first part with the edge and the second part with the grove being able to tilt with respect to each other.

4. A rotor according to any of the claims 1-3, wherein the hinge is comprising two parts, a first part being an inner shaft and a second part being an outer tube mounted on the inner shaft, the shaft and the tube being able to rotate with respect to each other.

5. A rotor according to any of the claims 1-3, wherein the generally perpendicular hinge axis is offset or angled with respect to a reference axis going trough and being perpendicular to both the rotor shaft axis and the longitudinal axis of the rotor blade.

6. A rotor according to any of the claims 1-3, wherein the number of rotor blades are three.

7. A method of manufacturing a rotor at least comprising a rotor shaft having a central axis and two flexible rotor blades having longitudinal axis where at least one rotor blade is separately connected to the rotor shaft or to a hub by a hinge having a hinge axis generally perpendicular to both the rotor shaft axis and to the longitudinal axis of the separately connected blade, wherein the method comprises the steps of:
   utilizing an injection molding machine to mould at least the hinge and the blade as one part and
   utilizing a material having properties that will form a strong flexible hinge when molded into a thin layer.

8. A rotor according to any of the claims 1-3, wherein the rotor blades can be disconnected from the ring encircling the rotor and folded up parallel with the rotor shaft axis for easy transportation.

* * * * *